US007839182B2

(12) United States Patent
Malherbe et al.

(10) Patent No.: US 7,839,182 B2
(45) Date of Patent: Nov. 23, 2010

(54) DETECTOR OF NOISE PEAKS IN THE POWER SUPPLY OF AN INTEGRATED CIRCUIT

(75) Inventors: Alexandre Malherbe, Trets (FR); Benjamin Duval, Saint-Maximin (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/641,415

(22) Filed: Dec. 19, 2006

(65) Prior Publication Data

US 2007/0139988 A1  Jun. 21, 2007

(30) Foreign Application Priority Data

Dec. 20, 2005  (FR) .................................. 05 53962

(51) Int. Cl.
*H03K 5/153* (2006.01)

(52) U.S. Cl. .............................. 327/58; 327/62; 327/77; 327/80; 327/81

(58) Field of Classification Search ................. 327/142, 327/143, 198, 391, 407, 408, 55, 58–62, 327/72–74, 77–81
See application file for complete search history.

(56) References Cited

U.S. PATENT DOCUMENTS

| 3,694,748 | A | * | 9/1972 | Hekimian | 324/103 P |
| 4,486,718 | A | * | 12/1984 | Sugawara | 330/149 |
| 5,331,209 | A | * | 7/1994 | Fujisawa et al. | 327/545 |
| 5,594,384 | A | * | 1/1997 | Carroll et al. | 329/369 |
| 5,825,238 | A | * | 10/1998 | Poimboeuf et al. | 327/552 |
| 6,085,342 | A | | 7/2000 | Marholev et al. | |
| 6,809,565 | B2 | * | 10/2004 | Kawakubo | 327/143 |
| 7,106,107 | B2 | * | 9/2006 | Bhattacharya et al. | 327/77 |
| 2002/0020903 | A1 | | 2/2002 | Kreft et al. | |
| 2002/0186038 | A1 | | 12/2002 | Bretschneider | |
| 2003/0226082 | A1 | | 12/2003 | Kim et al. | |
| 2004/0260932 | A1 | | 12/2004 | Blangy et al. | |

OTHER PUBLICATIONS

French Search Report from French Patent Application 05/53962, filed Dec. 20, 2005.

\* cited by examiner

*Primary Examiner*—Long Nguyen
(74) *Attorney, Agent, or Firm*—Lisa K. Jorgenson; James H. Morris; Wolf, Greenfield & Sacks, P.C.

(57) ABSTRACT

A circuit for detecting noise peaks on the power supply of an electronic circuit, including at least a first transistor having its control terminal connected to a terminal of application of a first potential of a supply voltage of the circuit and having a first conduction terminal connected to a terminal of application of a second potential via at least one first resistive element, the second conduction terminal of the first transistor providing the result of the detection.

18 Claims, 4 Drawing Sheets

DETECTOR OF NOISE PEAKS IN THE POWER SUPPLY OF AN INTEGRATED CIRCUIT

BACKGROUND OF THE INVENTION

1. Field of the Invention

The present invention generally relates to electronic circuits and, more specifically, to the detection of incidental or voluntary disturbances in the power supply of an electronic circuit. The present invention more specifically applies to the detection of such disturbances in the context of attacks by fault injection in the execution of programs or of algorithms by the circuit.

2. Discussion of the Related Art

FIG. 1 schematically shows a smart card 10 of the type to which the present invention applies as an example. Such a card is most often formed of a plastic support on or in which is placed an integrated circuit chip 1 associated with contacts 2 for communication with a terminal (not shown) and/or with radio-frequency transmit/receive elements, not shown, for a contactless communication.

FIG. 2 is a schematic block diagram illustrating a second example of application of the present invention to a receiver 20 of signals broadcast in controlled fashion, for example a decoder of television signals received by a satellite antenna 21 for display on a screen 22 of television set type. The decoding of the received transmissions is dependent on access rights managed by decoder 20 (for example, of a type known under name Set Top Box). In certain cases, decoder 20 comprises a smart card reader 10 of the type illustrated in FIG. 1, integrated circuit 1 of which contains the rights of access (more specifically, an identifier and generally a ciphering key) necessary for the proper decoding of transmissions. In other cases, integrated circuits (not shown) internal to decoder 20 comprise elements for managing the rights of access (especially, of deciphering).

FIG. 3 is a schematic block diagram of a conventional example of a microcontroller 1, for example, of a smart card, to which the present invention applies as an example. Such a circuit comprises a central processing unit 31 (CPU) capable of executing the programs most often contained in a non-volatile memory 32 (NVM), for example of ROM or EEPROM type, with which it communicates by means of one or several buses 33. Bus(es) 33 convey signals (address, control, and data signals) between the different elements of circuit 1 and between all or part of these elements and an input/output interface 34 (I/O) to communicate with or without contact with the outside. Most often, volatile storage elements 35 (MEM) of RAM type and/or of register type are contained in circuit 1. Other functions (block 36, FCT) may also be integrated to circuit 1 according to the application. For example, such functions may comprise a ciphering cell, an integrity check cell, etc.

Circuit 10 handles digital quantities (be it program or data instructions) which, in the applications aimed at by the present invention, condition the access to certain data (for example, telecast programs). It may be secret keys of ciphering algorithms, secret authentication codes, algorithmic steps of a program, etc.

Different attacks are likely to be implemented to attempt discovering the secrets of the integrated circuit or to make a protection of processed data inoperative, by examining the input/output signals and/or the power consumption of the circuit or any other quantity influenced by its operation. In particular, so-called fault injection attacks comprise causing a disturbance in the operation of integrated circuit 1 on execution of a cryptography or decoding algorithm and interpreting the subsequent circuit operation to attempt discovering the secret quantities. More simply, the disturbance may generate a jump in the program aiming at not executing instructions capable of forbidding the access to data.

The most current disturbance in fault-injection attacks is a disturbance on the circuit power supply (glitch attack) causing a noise peak of very short duration in the circuit power supply.

To attempt blocking such attacks, integrated circuits comprise software and/or hardware tools reacting to a disturbance in the circuit operation (countermeasure), to block the circuit operation, prevent the output of confidential data, make a calculation result inexploitable, etc. when a fraud attempt is detected.

Among such tools, the present invention more specifically relates to detectors of disturbances of the power supply of a circuit, for example, directly acting on the circuit by resetting the central processing unit, thus forbidding the possible hacker from taking advantage of the disturbance.

The need for a detector of power supply noise peaks especially results from the imperfection of voltage regulators most often equipping electronic circuits due to miniaturization needs, which prevent the use of filtering capacitors of sufficient size.

FIG. 4 very schematically shows in the form of blocks a conventional example of a circuit for detecting noise peaks in the power supply of an electronic circuit. This detector is based on a voltage comparator 41 (COMP) having its two inputs receiving a voltage proportional to supply voltage Vdd after filtering by resistive and capacitive circuits exhibiting different time constants. Voltage dividers (resistors R11 and R12 in series and resistors R21 and R22 in series) between a terminal 42 of application of voltage Vdd and ground 43 are coupled to the two input terminals (− and +) of comparator 41, a capacitor C1, respectively C2 connecting the corresponding comparator input (midpoint of the associated resistive bridge) to ground to form the filtering cell. The output of comparator 41 crosses a level adapter element 44 (BUF) having its output connected to a reset terminal R of central processing unit 31. The circuit of FIG. 4 is described, for example, in document US-A-2003/0226082. The values provided to the filtering cells define different time constants to detect a supply noise.

A disadvantage of the circuit of FIG. 4 is that it does not enable detecting fast noise peaks on the power supply. Now, more and more, noise peak attacks exploit very short peak durations (shorter than some hundred nanoseconds). The limits of the circuit of FIG. 4 are due not only to the filterings performed on the two inputs of comparator 41, but also to the very structure of this comparator, based on an operational amplifier structure. Such a structure is also complex.

Another disadvantage of the solution described in relation with FIG. 4, here again aggravated by the internal structure of the comparator, is that this circuit becomes even more complex to detect both positive and negative noise peaks.

SUMMARY OF THE INVENTION

The present invention aims at overcoming all or part of the disadvantages of known detectors of noise peaks of supply of an integrated circuit.

The present invention more specifically provides a fast detector, capable of detecting noise peaks of short durations (shorter than some hundred nanoseconds).

The present invention also provides a simple and low-bulk solution in the integrated circuit.

The present invention also provides a solution compatible with a detection of positive and/or negative noise peaks.

An embodiment of the present invention provides a circuit for detecting noise peaks on the power supply of an electronic circuit, comprising at least a first transistor having its control terminal connected to a terminal of application of a first potential of a supply voltage of the circuit and having a first conduction terminal connected to a terminal of application of a second potential via at least one first resistive element, the second conduction terminal of the first transistor providing the result of the detection.

According to an embodiment of the present invention, a first capacitive element connects said first conduction terminal to a terminal of application of a reference potential of the power supply voltage, the respective values of the first resistive element and of the first capacitive element being selected according to the minimum duration of the noise peaks to be detected.

According to an embodiment of the present invention, a second resistive element forms, with said first resistive element, a voltage-dividing bridge having an intermediate terminal connected to said first conduction terminal of the first transistor.

According to an embodiment of the present invention, a third resistive element connects said intermediate terminal to the first conduction terminal of the first transistor.

According to an embodiment of the present invention, said control terminal of the first transistor is directly connected to said terminal of application of the first potential of the power supply voltage.

According to an embodiment of the present invention, a first secondary resistive element connects said terminal of application of the first potential of the supply voltage to the control terminal of the first transistor.

According to an embodiment of the present invention, a second secondary resistive element connects said control terminal of the first transistor to the reference potential of the supply voltage.

According to an embodiment of the present invention, the circuit comprises a second transistor of a type opposite to the first one to form a bi-directional noise peak detector, the respective control terminals of the two transistors being connected together to said terminal of application of the first potential of the supply voltage.

According to an embodiment of the present invention, the second transistor is connected in parallel on the first one.

According to an embodiment of the present invention, the second transistor has its first conduction terminal connected to a first electrode of a second capacitive element having its other electrode connected to said terminal of application of the reference potential, each transistor being associated with a first resistive element of different value.

According to an embodiment of the present invention, said first transistor is a MOS transistor.

According to an embodiment of the present invention, said first transistor is a bipolar transistor.

According to an embodiment of the present invention, the first and second potentials are identical.

According to an embodiment of the present invention, the resistive and/or capacitive elements are selected according to the amplitude and to the minimum duration of the peaks to be detected.

The present invention also provides an electronic circuit comprising a detector of noise peaks on its power supply.

The present invention also provides a smart card, an electronic decoder, a card reader, a ciphering/deciphering circuit comprising a detector of noise peaks.

BRIEF DESCRIPTION OF THE DRAWINGS

The foregoing and other features, and advantages of the present invention will be discussed in detail in the following non-limiting description of specific embodiments in connection with the accompanying drawings.

DETAILED DESCRIPTION

Figure 1:
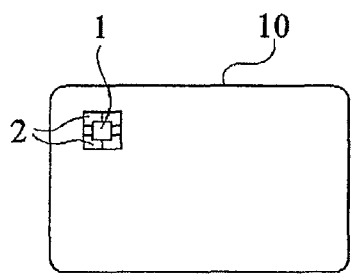
FIG. 1, previously described, schematically shows a smart card of the type to which the present invention applies as an example.
Figure 2:
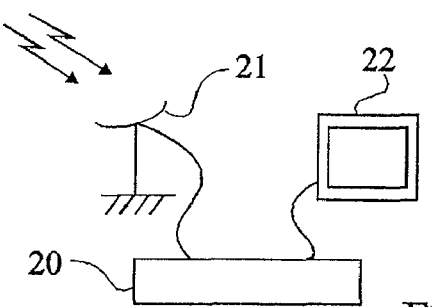
FIG. 2, previously described, shows a television signal decoder system of the type to which the present invention applies as an example.
Figure 3:
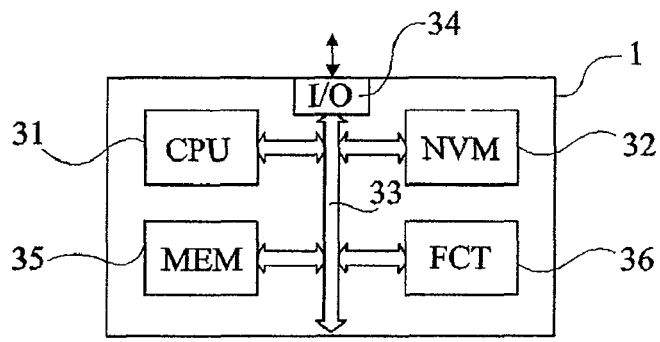
FIG. 3, previously described, is a schematic block diagram of an example of an integrated circuit of the type to which the present invention applies.

The same elements have been designated with the same reference numerals in the different drawings. For clarity, only those steps which are useful to the understanding of the present invention have been shown in the drawings and will be described hereafter. In particular, the exploitation of the noise peak detection signal has not been described in detail, the present invention being compatible with any conventional exploitation of such a detection signal.

A feature of the present invention is to directly compare proportional but unfiltered data of the circuit supply voltage with respect to a threshold, this threshold being preferably self-adapting according to this supply voltage.

Figure 5:
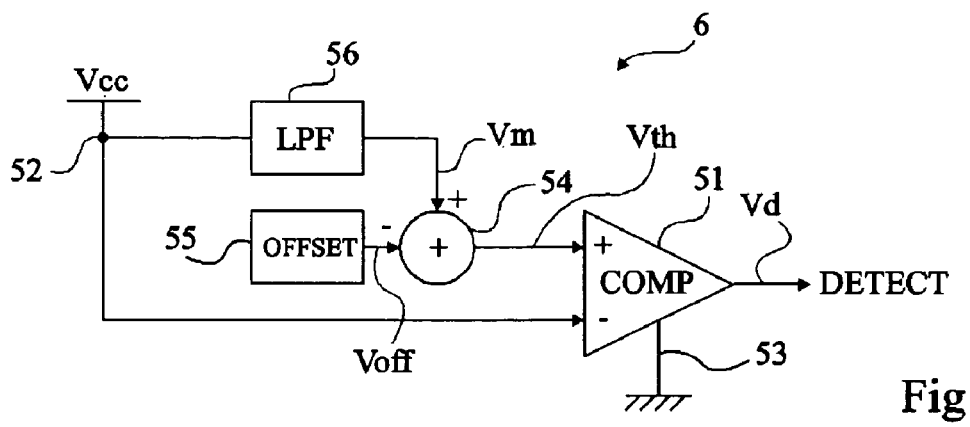
FIG. 5 is a schematic block diagram illustrating in an embodiment of a noise peak detector according to the present invention.

FIG. 5 is a schematic block diagram of an embodiment of a negative noise peak detector according to the present invention.

A comparison element 51 (COMP) compares voltage Vcc applied between a positive terminal 52 and a ground terminal 53 with a threshold voltage Vth. The result provided by comparator 51 is the detection signal DETECT exploitable, as will be seen hereafter, preferably in the form of a voltage signal Vd. Voltage Vth preferably corresponds to an average value Vm of voltage Vcc minus an offset voltage Voff. Functionally, an adder 54 subtracts voltage Voff provided by a block 55 (OFFSET) to average value Vm provided by a low-pass filter 56 (LPF) receiving voltage Vcc.

An advantage of the present invention which already appears from the functional diagram of FIG. 5 is its capacity to detect peaks of short duration due to the direct comparison of signal Vcc which, in this embodiment, is not filtered.

Figure 6:
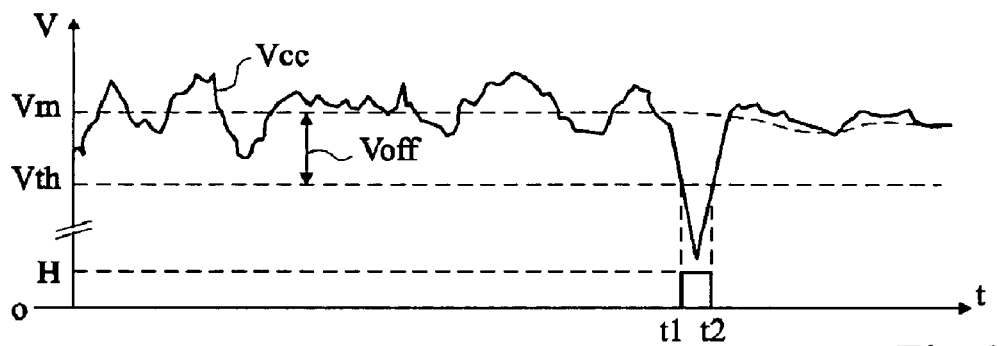
FIG. 6 illustrates the operation of the detector of FIG. 5.

FIG. 6 illustrates, in a timing diagram, the operation of the circuit of FIG. 5. This drawing shows an example of shape of voltage Vcc from which average value Vm and threshold value Vth (smaller than value Vm for a negative peak detector) are calculated. Voltage Vcc is generally polluted by different parasites, for example, the switchings performed by the circuit that it powers. The selection of voltage Voff conditions the amplitude of the noise peaks taken into account by the detector. In the example of FIG. 6, it is assumed that at a time t1, a negative noise peak of sufficient amplitude exceeds threshold Vth. This then causes a switching of the output of comparator 51. In this example, a voltage Vd at a high state (H) in the presence of a noise peak is assumed. The presence of the peak may itself be enough to slightly decrease the average value. The high state duration of detection signal Vd depends on the peak duration. If necessary, a storage element (not shown) of the activation of signal DETECT is provided.

According to a preferred embodiment of the present invention, comparison element 51 is formed of a simple MOS transistor. More generally, it may be any type of transistor (bipolar, FET, etc.).

Figure 7:
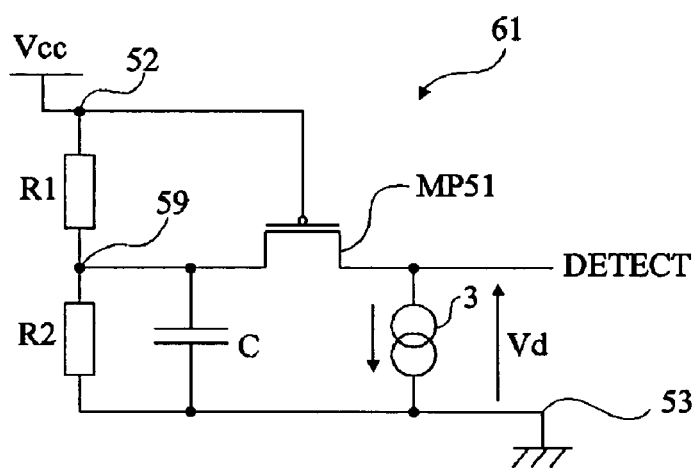
FIG. 7 shows the detailed electric diagram of a first embodiment of a negative noise peak detector according to the present invention.

FIG. 7 shows a first embodiment of a detection circuit 61 according to the present invention. Comparator 51 is, for a detector of negative peaks on a positive voltage Vcc, formed of a P-channel MOS transistor MP51. The gate of transistor MP51 is directly connected to terminal 52 of application of voltage Vcc. A dividing bridge formed in this example of two resistive elements R1 and R2 in series between terminals 52 and 53 has its midpoint 59 connected to the source of transistor MP51, a capacitive element C connecting this midpoint 59 to ground 53. Functionally, point 59 corresponds to the output of low-pass filter 56 (FIG. 5) while the gate of transistor MP51 shows the inverting input (−) of comparator 51. Finally, a current source 3 preferentially connects the drain of transistor MP51 to ground. Voltage Vd across this current source represents the detection signal DETECT. The signal in all or nothing is easily exploitable by a circuit or system as a digital signal indicative of an attack attempt.

The time constant of the low-pass filter is determined by the product of resistance R1 by capacitance C (cut-off frequency fc=1/2πR1C).

The offset (Voff) with respect to the averaged level (Vm) is, as a first approximation, set by resistors R1 and R2 and by the threshold voltage of transistor MP51 (Voff=(R1.Vcc)/(R1+R2)+|Vt|, where |Vt| represents the absolute value of the threshold voltage of transistor MP51).

Transistor MP51 is on when noisy voltage Vcc, minus average value Vm set by elements R1 and C, becomes greater than or equal to the absolute value of its threshold voltage Vt.

In the embodiment of FIG. 7, this condition on the conduction is settable by resistance R2. The more the value of resistance R2 increases, the lower voltage Voff.

Current source 3 is formed, for example, of a simple resistor or of an active current source. It will however be ascertained for its equivalent resistance to be greater than the value of resistance R1 so as not to absorb the noise peaks to be detected. The objective of current source 3 is to provide, between its terminals, a voltage (Vd) representative of the detection by pulling part of the current towards the ground (pull down).

In the quiescent state, the current consumption is limited to the current flowing in resistive bridge R1, R2, having its values preferentially selected to be sufficiently high (several tens of kilo ohms). A trade-off needs to be made between the space available in the circuit and the consumption in the quiescent state.

As a specific example of embodiment, an assembly of the type illustrated in FIG. 7 may be formed with components having the following values:
R1=100 kΩ;
R2=1 MΩ;
active current source 3 of one µA; and
C=3 pF.

An advantage of the present invention is that the detection circuit is particularly simple to form. In particular, the comparator of the present invention is, in one embodiment, to a transistor.

Figure 8:
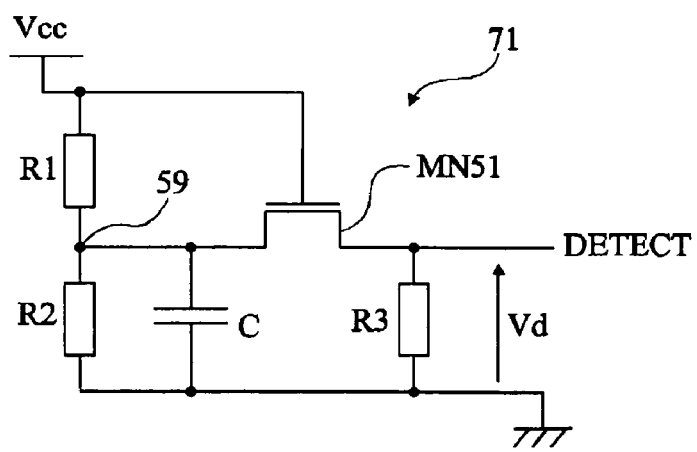
FIG. 8 shows the detailed electric diagram of a first embodiment of a noise peak detector according to the present invention.

FIG. 8 shows a first embodiment of a circuit 71 for detecting noise peaks with respect to a positive voltage Vcc according to the present invention. The only difference with respect to the assembly of FIG. 7 is the use of an N-channel transistor MN51 instead of a P-channel transistor. In FIG. 8, current source 3 has been shown in the form of a resistor R3. However, an active current source 3 is preferred for its space gain over a resistor R3 of several hundreds of kiloohms.

For an N-channel transistor, offset Voff with respect to average value Vm becomes, as a first approximation: Voff=|Vt|−(R1.Vcc)/(R1+R2), where |Vt| represents the absolute value of the threshold voltage of transistor MN51.

For simplification, resistor R3 (or output current source) is not illustrated in the following drawings. This active or passive current source may besides be integrated to the circuit for interpreting the result of the detection located downstream of the actual detector.

Figure 9:
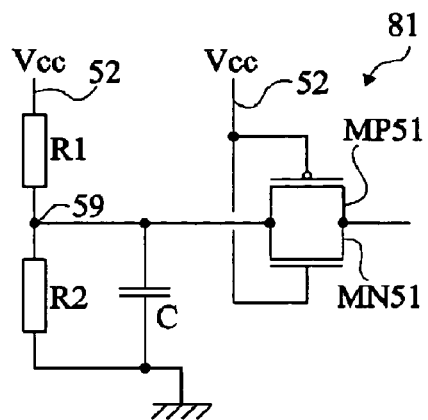
FIG. 9 shows an embodiment of a positive noise peak detector according to the present invention.

FIG. 9 shows an embodiment of a detector 81 of positive and negative noise peaks with respect to a voltage Vcc. In the example of FIG. 9, the forming of such a bi-directional detector is particularly simple since, in most cases, dissymmetrical thresholds are sufficient. Such is in practice the case for circuits with regulators based on N-channel power transistors which filter positive peaks better than negative peaks. It is then enough to place two P-channel and N-channel transistors MP51 and MN51 in parallel (source of transistor MP51 and drain of transistor MN51 on the side of capacitor C) without it being necessary to modify the elements (resistors R1, R2, capacitor C) used to establish the average value and the thresholds. The respective gates of transistors MP51 and MN51 receive, preferably directly, voltage Vcc. In the assembly of FIG. 9, the offset setting the negative peak detection threshold with respect to the average value of voltage Vcc is smaller than the offset setting the positive peak detection threshold with respect to the same average value of voltage Vcc.

Figure 10:
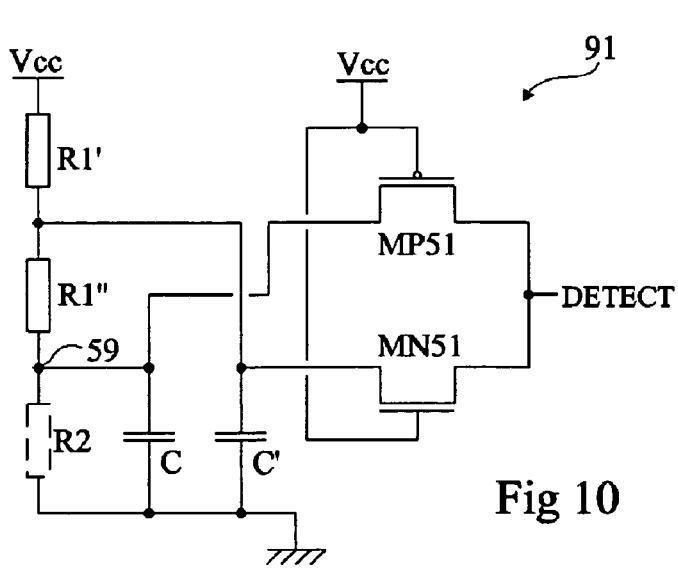
FIG. 10 shows another embodiment of a positive and negative noise peak detector according to the present invention.

FIG. 10 shows another embodiment of a bidirectional noise peak detector 91 applied to the case where symmetrical detection thresholds are desired (for example, in the case of circuits powered by regulators less efficient than N-channel power transistor regulators). In this case, the source of transistor MP51 (connected to capacitor C and to midpoint 59) must be dissociated from the drain of transistor MN51. An additional capacitor C' connects the drain of transistor MN51 to the junction point of two resistors in series R1' and R1' then replacing resistor R1. An appropriate sizing of the resistors provides identical thresholds of detection of negative and positive peaks.

Different embodiments and variations will be described hereafter in relation with a detector of negative noise peaks on a positive power supply voltage. All these embodiments and variations also apply to positive peak detectors by replacing the channel type of the transistor as in FIG. 8 and to bi-directional detectors by associating two transistors of different channel type, preferably, as in FIG. 9.

Figure 11:
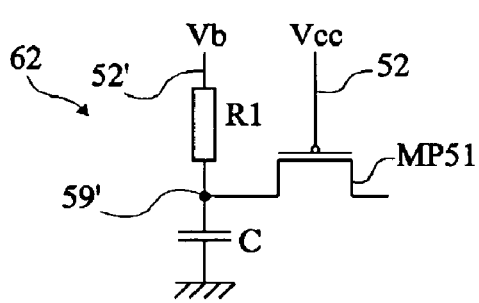
FIG. 11 shows a second embodiment of a negative noise peak detector according to the present invention.

FIG. 11 shows a second embodiment 62 of a negative peak detector according to the present invention. As compared to the first embodiment (61, FIG. 7), resistor R2 has been eliminated. This eliminates any consumption of the detector in the quiescent state. This however limits the potential setting of offset voltage Voff, which then becomes a function of the value of resistor R1 and of threshold voltage Vt of MOS transistor MP51, but also of its gate width-to-length ratio (W/L) and of the value of the output current source (3, FIG. 7), the effects of which can no longer be neglected.

FIG. 11 also illustrates a variation of the present invention according to which the voltage applied on resistor R1 (terminal 52') is a voltage Vb different from voltage Vcc. The gate of transistor MP51 remains connected to terminal 52 receiving noised voltage Vcc. For example, voltage Vb is a fixed bias voltage. This example is however not a preferred embodiment since average voltage Vm then does not follow the possible variations of voltage Vcc. According to another example, voltage Vb is a voltage different from voltage Vcc while remaining linked to the latter to preserve the self-adaptive character of the detection threshold.

Figure 4:
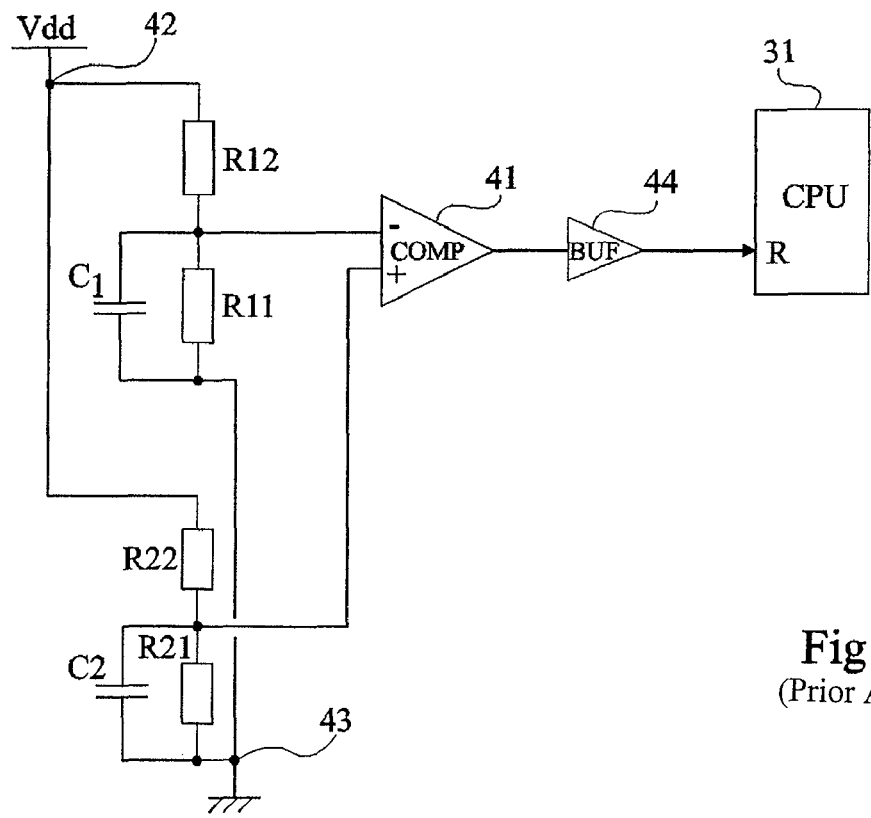
FIG. 4, previously described, shows a conventional example of a noise peak detector.
Figure 12:
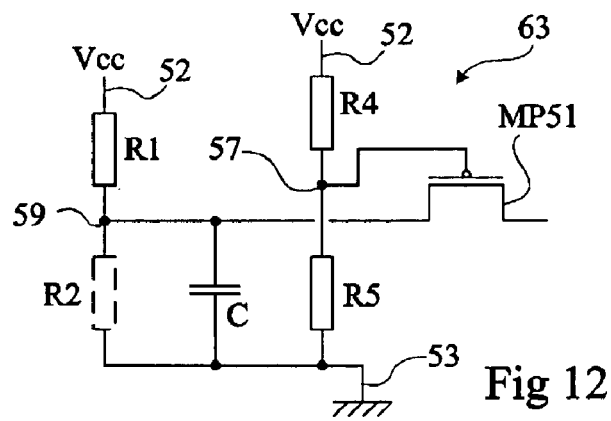
FIG. 12 shows a third embodiment of a negative noise peak detector according to the present invention.

FIG. 12 shows a third embodiment of a detector 63 of negative noise peaks according to the present invention. A dividing bridge, formed of two resistive elements R4 and R5 in series between terminal 52 and ground 53, collects data (midpoint 57 of the bridge) proportional to voltage Vcc for application thereof on the gate of transistor MP51. Resistor R4 performs a filtering with the gate capacitance of transistor MP51 and is thus selected with a relatively low value with respect to the value of resistor R1 to avoid adversely affecting the detection. The lower the voltage of point 57, the more sensitive the detector. Even with this filtering which makes the detector slightly less sensitive, the present invention remains advantageous with respect to the known circuit (FIG. 4), especially due to the simplicity of the comparator.

An advantage of the embodiment of FIG. 12 is that bridge R4, R5 forms a second element for setting offset voltage Voff with respect to the average value. The more the value of resistor R5 increases with respect to the value of resistor R4, the more the threshold (Vth) draws away from average value Vm. This enables, for example, getting rid of resistor R2 (shown in dotted lines to insist on its optional character) without loosing the possibility of setting the value of offset Voff. The detector bulk is thus decreased, resistors R4 and R5 being of lower values than resistors R1 and R2 and thus taking less room. This however generates a slightly greater continuous power consumption of the detector with respect to the embodiment of FIG. 7.

Figure 13:
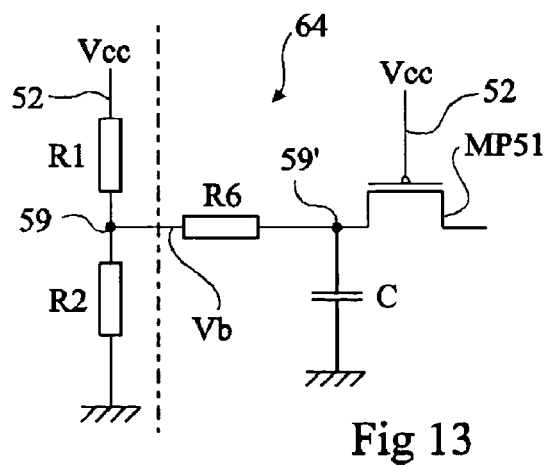
FIG. 13 shows a fourth embodiment of a negative noise peak detector according to the present invention.

FIG. 13 shows a fourth embodiment of a negative noise peak detector 64 according to the present invention. An additional resistor R6 is interposed between midpoint 59 of the dividing bridge of resistors R1 and R2 and source 59' of transistor MP51. The function of resistor R6 is to add an additional setting for the filtering of average value Vm. Such an embodiment may be used in particular in the case where point 59 is the midpoint of a resistive dividing bridge used for other purposes in the electronic circuit. A same dividing bridge can thus be shared with other applications (for example, with the voltage regulator), which decreases the bulk. Functionally, this amounts to considering that midpoint 59 corresponds to terminal 52' of application of voltage Vb (FIG. 11) different from voltage Vcc. Voltage Vb however here remains proportional to voltage Vcc, which enables preserving the self-adaptive character of the detection threshold.

Figure 14:
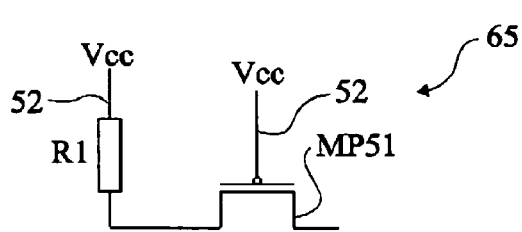
FIG. 14 shows a fifth embodiment of a negative noise peak detector according to the present invention.

FIG. 14 shows a fifth embodiment of a negative peak detector 65 according to the present invention. This detector is here shown in its simplest form where a resistor R1 is connected between terminal 52 of application of voltage Vcc and the source of transistor MP51 having its gate directly receiving voltage Vcc. In this embodiment, the stray source-substrate capacitance of transistor MP51 here plays the role of capacitor C.

Figure 15:
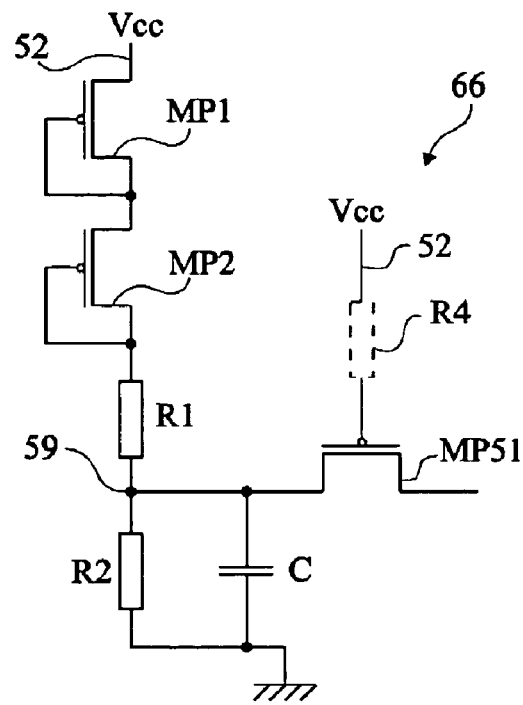
FIG. 15 shows a sixth embodiment of a negative noise peak detector according to the present invention.

FIG. 15 shows the electric diagram of a sixth embodiment of a negative peak detector 66 according to the present invention. Two P-channel MOS transistors MP1 and MP2 are diode-assembled in series between terminal 52 and resistor R1. Such a structure enables decreasing the voltage across dividing bridge R1, R2, and thus the values of these resistors and, accordingly, their sizes.

FIG. 15 illustrates another variation according to which a resistor R4 (in dotted lines) connects the gate of transistor MP51 to terminal 52 of application of voltage Vcc. Resistor R4 introduces a slight filtering but may be provided with the lowest possible value, to avoid adversely affecting the detector passband.

Figure 16:
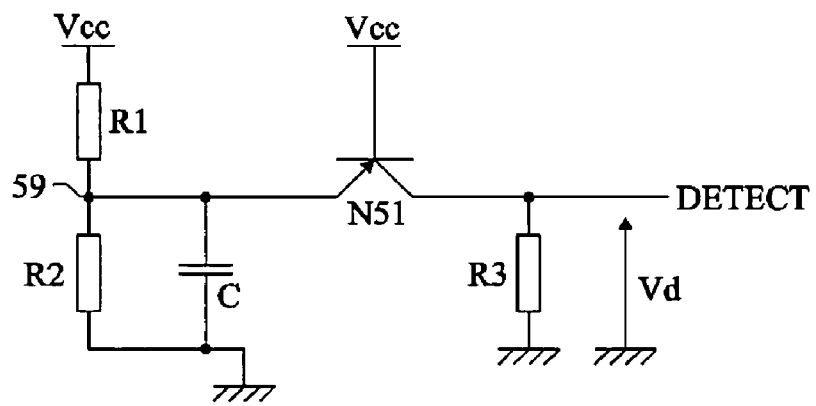
FIG. 16 shows an embodiment with a bipolar transistor of a negative noise peak detector according to the present invention.

FIG. 16 shows the electric diagram of an embodiment of the present invention adapted to the use of a bipolar transistor N51 to form a negative noise peak detector. As compared with the embodiment of FIG. 7, the only difference is the replacing of transistor MP51 with a PNP transistor having its emitter connected to point 59, having its collector providing signal DETECT (across a, for example, resistive element R3 for pulling down the output voltage) and having its base connected to terminal 52 of application of voltage Vcc. Offset Voff with respect to average value Vm of voltage Vcc depends, as a first approximation, on ratio VccR1/(R1+R2) and on the base-emitter voltage drop Vbe of the bipolar transistor.

Figure 17:
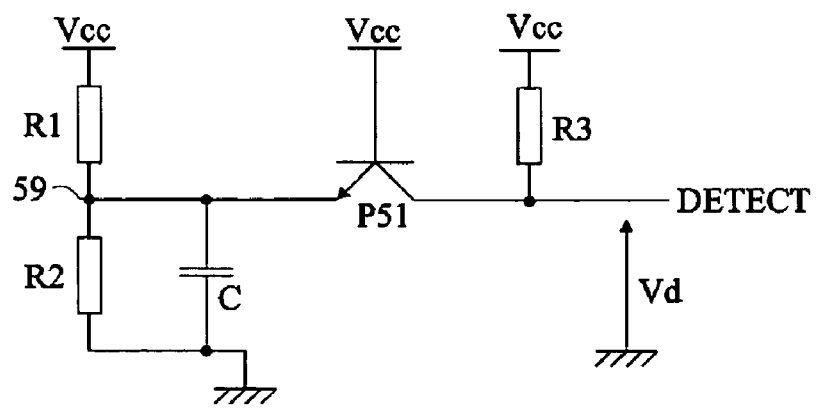
FIG. 17 shows an embodiment with a bipolar transistor of a positive noise peak detector according to the present invention.

FIG. 17 shows another embodiment with a bipolar transistor P51 for detecting positive peaks. As compared with the assembly of FIG. 8, transistor MN51 is replaced with an NPN transistor having its emitter connected to point 59, having its base receiving voltage Vcc and having its collector providing the detection signal. As compared with the negative detector, a current source (for example, resistor R3) pulling the output towards voltage Vcc must be provided (in the bipolar case).

An advantage of the present invention is that it enables detection of noise peaks in simple and reliable fashion.

Another advantage of the present invention is that it enables reusing elements present at other locations of the electronic circuit (especially the resistive dividing bridges).

Another advantage of the present invention is that it is compatible with any conventional exploitation of a signal of detection of a disturbance by a noise peak on the power supply of an electronic circuit.

Of course, the present invention is likely to have various alterations, improvements, and modifications which will readily occur to those skilled in the art. In particular, although the different embodiments have been described in relation with an application to the detection of peaks on a positive power supply, this is an arbitrary sign convention.

Further, the different embodiments and variations may be combined (including by mixing the transistor families) and the dimensions to be given to the different resistors and capacitors are within the abilities of those skilled in the art based on the functional indications given hereabove and on the application. The resistive elements (in principle, integrated resistors) may, if need be, be formed of MOS transistors.

Moreover, the present invention also applies to integrated circuits directly assembled on electronic cards. For example, the detector may be located on the card reader side since the supply signal originates from this reader, be it with or without contact.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for detecting noise peaks on a power supply of an electronic circuit, the power supply providing a first potential of a supply voltage, the circuit comprising:
   a power terminal at which is applied the first potential of the supply voltage;
   a low-pass filter receiving as input the first potential of the supply voltage and providing as output a second potential and a third potential of the supply voltage, the low-pass filter comprising at least one first resistive element; and
   at least first and second transistors each having their control terminals connected to the power terminal of application of the first potential of the supply voltage of the circuit and each having first conduction terminals at which is applied one of the second and third potentials of the supply voltage, a second conduction terminal of each of the first and second transistors providing the result of the detection, wherein the first and second transistors are of opposite type and are connected in parallel to the low-pass filter.

2. The circuit of claim 1, wherein the low-pass filter comprises a first capacitive element connected to at least one of said first conduction terminals and to a terminal of application of a reference potential of the power supply voltage, and
   wherein respective values of the first resistive element and of the first capacitive element are selected according to the minimum duration of the noise peaks to be detected.

3. The circuit of claim 2, wherein the first resistive element or the first capacitive element or the first resistive element and the first capacitive element are selected according to the amplitude and to the minimum duration of the peaks to be detected.

4. The circuit of claim 1, wherein the low-pass filter further comprises a second resistive element, and
   wherein the second resistive element forms, with said first resistive element, a voltage-dividing bridge having an intermediate terminal connected to said first conduction terminal of the first transistor.

5. The circuit of claim 1, wherein said control terminal of the first transistor is directly connected to said power terminal of application of the first potential of the power supply voltage.

6. The circuit of claim 1, wherein the first and second transistors form a bi-directional noise peak detector.

7. The circuit of claim 6, wherein the low-pass filter comprises a capacitive element, and
   wherein the first conduction terminal of the second transistor is connected to a first electrode of the capacitive element and another electrode of the capacitive element is connected to a terminal of application of a reference potential, and
   wherein the at least one first resistive value comprises at least two first resistive elements each having a different value, each of the at least two first resistive elements forming at least a portion of a resistor network, the resistor network yielding the second and third potentials.

8. The circuit of claim 1, wherein said first transistor is a MOS transistor.

9. An electronic circuit comprising a detector of noise peaks on its power supply, wherein the detector is that of claim 1.

10. The circuit of claim 1, wherein the second conduction terminal of the first transistor is an output terminal of the first transistor.

11. A circuit for detecting noise in a power supply signal, the circuit comprising:
    at least one circuit element that low-pass filters the power supply signal to produce at least one threshold signal; and
    a comparison element comprising a control terminal and a conduction terminal, wherein the control terminal receives an unfiltered version of the power supply signal and the conduction terminal receives the at least one threshold signal, wherein the comparison element produces a binary noise detection signal in response to the at least one threshold signal and the unfiltered version of the power supply signal, the comparison element producing the binary noise detection signal based on whether the power supply signal rises above one of the at least one threshold signal or drops below one of the at least one threshold signal, the binary noise detection signal indicating a presence or absence of noise in the power supply signal as compared to the at least one threshold signal.

12. The circuit of claim 11, wherein the comparison element comprises first and second transistors of different types.

13. The circuit of claim 12, wherein the first and second transistors of different types are connected in parallel to the at least one circuit element that low-pass filters.

14. The circuit of claim 13, wherein each of the first and second transistors has a conduction terminal receiving one of the at least one threshold signal.

15. The circuit of claim 11, wherein the power supply signal is provided by first and second power supply terminals of the circuit, and
    wherein the at least one circuit element that low-pass filters comprises a low-pass filter that low-pass filters the power supply signal, the low-pass filter comprising:
      a voltage divider having a first end coupled to the first power supply terminal and a second end coupled to the second power supply terminal; and
      a capacitor coupled to an intermediate terminal of the voltage divider.

16. The circuit of claim 15, wherein the voltage divider comprises resistors, and wherein the values of the capacitor and the resistors are selected based on a minimum duration of the noise to be detected.

17. The circuit of claim 15, wherein the control terminal is coupled to the first power supply terminal and the first conduction terminal is coupled to the intermediate terminal.

18. The circuit of claim 11, wherein the at least one threshold signal is produced by subtracting an offset from a low-pass-filtered version of the power supply signal.

* * * * *